Sept. 23, 1952 — G. SUDMEIER — 2,611,345
WATER OR VAPOR INJECTOR FOR INTERNAL-COMBUSTION ENGINES
Filed April 11, 1947
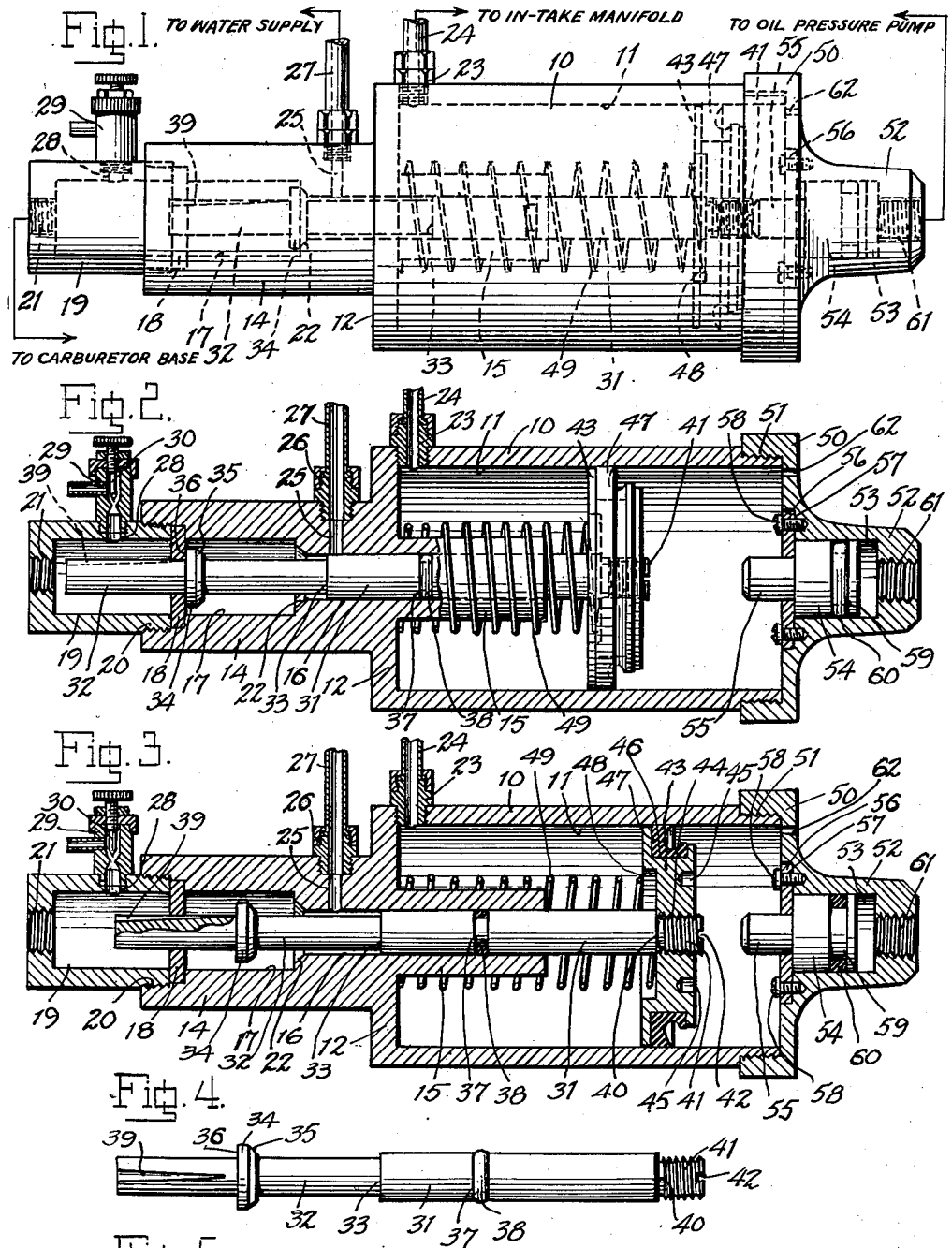
INVENTOR.
GUS SUDMEIER
BY Hanrahan & Mattern
ATTORNEYS.

Patented Sept. 23, 1952

2,611,345

UNITED STATES PATENT OFFICE 2,611,345

WATER OR VAPOR INJECTOR FOR INTERNAL-COMBUSTION ENGINES

Gus Sudmeier, Torrance, Calif.

Application April 11, 1947, Serial No. 740,872

4 Claims. (Cl. 123—25)

The present invention relates to a water or vapor injector for internal combustion engines, and has for its object to provide a device of this character whereby increased power and engine efficiency are obtained, the consumption of fuel is reduced, engine life between overhauls is increased, the formation of carbon in the engine head is prevented, and other advantages are obtained as a result of the introduction of water or vapor in automatically regulated quantity into the fuel supplied to the engine. Another object is to provide a water or vapor injector, controlled in its automatic action by the intake manifold pressure, to the end that the supply of water or vapor is increased in direct ratio to the speed of the engine. A further object is to provide a water or vapor injector in which means is provided for automatically shutting off the water or vapor feed to the injector when the engine is shut off. Another object is to provide a water or vapor injector in which means is provided for automatically shutting off the water or vapor feed to the carburetor system of the engine at idling speed of the engine, so that flooding of the engine is prevented. A further object is to provide a water or vapor injector having means for automatically supplying air at all speeds of the engine above idling, so as to give velocity to the water or vapor supply stream.

A further object is to provide an injector which can be used either for water or vapor injection, or as an upper cylinder or valve lubricator, or oiler.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a side elevation of the water or vapor injector, according to the illustrated exemplary embodiment of the invention, the same being shown in its operative position when the engine is shut off.

Fig. 2 is a longitudinal vertical sectional view of the injector, partially in side elevation, the same being shown in its operative position when the engine is idling.

Fig. 3 is a longitudinal vertical sectional view of the injector, the same being shown in its operative position when the engine is being operated at driving speeds.

Fig. 4 is a detail plan view of the injector valve shaft.

Fig. 5 is a forward end view thereof.

Similar reference characters indicate corresponding parts throughout the several figures of the drawings.

Referring to the drawings, the water or vapor injector for internal combustion engines, according to the illustrated exemplary embodiment of the invention, comprises a hollow cylindrical body 10 providing a cylindrical vacuum chamber 11, closed at its forward end by a transverse wall 12, provided centrally with a forward cylindrical extension 14 and a rearward cylindrical extension 15, the latter being of smaller diameter than the extension 14 and extending within the vacuum chamber. An axial cylindrical bore 16 is provided in the extension 15 and in the rearward part of the extension 14 and connects at its forward end with a cylindrical water or vapor chamber 17 provided in the forward part of the extension 14, and in the forward recessed end of which is seated a circular orifice plate 18, secured in place by a mixing chamber member 19, screwed at 20 into the end of the extension 14. A threaded hole 21 is provided in the forward end of the chamber 19, in which one end of a feeding tube is adapted to be secured, its other end being connected to the carburetor base. The shoulder between the bore 16 and the water or vapor chamber 17 is provided with a chamfered valve seat 22 for engagement by the closure valve means of the injector valve shaft, in the shut off condition of the engine, as will hereinafter more fully appear.

At the forward end of the vacuum chamber 11, there is provided a nipple connection 23 to which one end of a tube 24 is connected, the other end of this tube being suitably connected to the in-take manifold of the internal combustion engine, and whereby the pressure in the manifold creates a pressure in the tube 24 and thus reduces the vacuum in the vacuum chamber proportionately to the increase in pressure in the in-take manifold, the vacuum being greatest when the engine is idling and decreasing proportionately as the engine is speeded up.

The bore 16, in which the injector valve shaft operates, is provided with an inlet passage 25 provided with a nipple connection 26, to which one end of a tube 27 is connected, the other end of this tube being suitably connected to the water pump or other suitable source of water supply associated with the internal combustion engine, and through which water is supplied to the injector.

The mixing chamber 19 is provided with an inlet passage 28 in which is secured an air bleed-valve 29, provided with an adjustable needle control 30, and which is adapted to supply air to the mixing chamber for the purpose of giving increased velocity to the water or vapor supply stream to the carburetor, as will hereinafter more fully appear.

The injector valve shaft comprises a main part 31 slidably engaged within the bore 16, and a reduced diameter forward extension part 32 forming a shoulder 33 with the main part 31, the forward end of the extension part 32 being slidably engaged in the opening of the orifice plate 18. A flange extension 34 is provided upon the extension part 32 of the shaft within the water or vapor chamber 17, provided at its rearward side with a chamfered sealing face 35 adapted in one operative position of the shaft, as shown in Fig. 1, to seat in sealing relation in the camfered valve seat 22 at the forward end of the bore 16, and provided at its forward side with a flat face 36, adapted in another operative position, as shown in Fig. 2, to engage in sealing relation against the rearward face of the orifice plate 18. The shaft is provided in rearwardly spaced relation to the shoulder 23 with an annular groove 37 in which is engaged a sealing gasket 38, formed of neoprene, or other suitable material, and which forms a moving seal within the bore 16. Neoprene is a long-chain synthetic rubber made by the polymerization of chloroprene (monochloro-butadiene, $H_2CCClCHCH_2$).

Forwardly of the flange 34, the injector valve shaft is provided with a longitudinally disposed V-groove 39, of gradually increasing width and depth toward its forward end, its rearward or point end being spaced forwardly of the flange 34 a distance substantially corresponding to the thickness of the orifice plate 18, so that in the forward closed position of the shaft, as seen in Fig. 2, a continuous cylindrical surface of the shaft is in sealing contact with the cylindrical surface of the orifice.

At its rearward end the injector valve shaft is provided with an abutment shoulder 40 and a threaded extension 41 provided with a screw-driver receiving slot 42, and upon which is engaged the piston 43, having a central threaded hole 44 for engagement upon the threaded extension 41. Socket holes 45 are provided in the rearward face of the piston for facilitating its assembly with the injector shaft, the piston adapted to be held by a suitable holding tool engaged in the sockets 45 while the shaft is turned by means of a screw-driver engaged with the slot 42 to thus screw the shaft into the piston, the piston in its assembled position abutting the shoulder 40 of the shaft. A groove 46 is provided in the periphery of the piston in which is engaged a sealing gasket 47 formed of vinyl resin thermoplastic, or other suitable material. At its forward side the piston is provided with an annular recess 48 in which is seated one end of a helical compression spring 49, its other end being engaged with the forward wall 12 of the vacuum chamber and disposed about the extension portion 15.

The rearward end of the vacuum chamber is closed by a flanged cap member 50, screwed 51 upon the body 10 and provided with a centrally disposed rearwardly projecting extension boss 52, having a cylindrical chamber 52 formed therein, in which is slidably engaged a plunger 54 provided with a forwardly projecting stud 55 slidable in a centrally apertured closure plate 56 secured within a recess 57 at the forward side of the cap member by means of screws 58. The plunger is provided with an annular groove 59 in which is engaged a sealing gasket 60, formed of "neoprene," or other suitable material. A threaded hole 61 is provided in the rearward end of the extension 52 for attachment thereto of a tube extending to the oil pressure pump of the internal combustion engine, and whereby oil is supplied under pressure to the chamber 53, thus providing hydraulic pressure behind the plunger, brought about by the oil pressure being built up and killed at a slower rate than the pneumatic pressure which operates on the piston 43.

The stud 55 of the plunger is in direct line with the rearward end of the injector shaft and is engaged thereby as the piston and the injector shaft move to the operative position, as shown in Fig. 1, under the force of the spring 49, its function being to cushion the action of the piston and thus prevent violent closure of the chamfered sealing flange 34 with the seat 22. A bleeder hole 62 is provided in the cap 50 to exhaust and admit air behind the piston, and this hole also assists in the cushioning action, its relatively small size preventing fast escape of air so that there is an appreciable air cushion behind the piston as it moves to the operative position shown in Fig. 1.

The operation is as follows. The vacuum chamber 11 is in effect a closed extension of the intake manifold of the engine, being completely sealed against admission of air except through the connection tube 24 between the vacuum chamber and the intake manifold. The pneumatic effect is that an increase in velocity in the intake manifold of the flow of fuel from the carburetor causes a proportionate increase in pressure through the tube 24 to the vacuum chamber and a corresponding reduction of the vacuum therein.

Thus when the engine is shut off, the vacuum in the chamber 11 is destroyed, and the spring 49 acting against the piston 43 moves the injector valve shaft to the right, as seen in Fig. 1, the sealing surface 35 of the flange extension 34 seating in sealing engagement with the seat 22. As the piston and shaft move to the right, air in the chamber 11 at the right of the piston is released through the bleed hole 62, its restricted size causing the in-trapped air to act as an air cushion. In moving to this operative position, the end 41 of the shaft contacts the projecting stud 55 of the oil pressure plunger 54 which retracts against pressure of the oil in the chamber 53, thus cushioning the closing action of the valve shaft and preventing its engagement with the valve seat with a sudden or violent impact. As the decrease in the oil pressure in the oil pump system of the engine is at a slower rate than the reduction of pressure in the intake manifold upon shutting off the engine, there is sufficient residual pressure in the oil system to provide the desired cushioning action. In this position of the injector, the supply of water or vapor feed through the inlet opening 25 is stopped, thus preventing any loss of water or vapor through the air bleed-valve 29.

When the engine is idling, a vacuum is built up in the vacuum chamber 11, causing the piston 43 and the injector valve shaft to move to the left against the pressure of the spring 49, the air chamber to the right of the piston having air admitted thereto through the bleed hole 62. In this position of the injector, as shown in Fig. 2, the shaft part 31 closes the water or vapor inlet 25, the flat surface 36 of the flange extension 34 engages and seals the inner side of the orifice plate 18, and the shaft part 32 between the point end of the V-groove 39 and the flange 34 engages within the orifice opening to seal it. Thus a triple sealing action is provided, and the feed of water or vapor is effectually stopped. This stoppage of the feed of water or vapor at idling speed is of vital importance to prevent the flooding of the engine.

When the engine is speeded up, the vacuum in the vacuum chamber 11 is reduced and the spring 49 moves the piston 43 and the injector valve shaft to the right, as shown in Fig. 3. This action opens the inlet passage 25 to admit water or vapor, and opens the orifice plate, so that water or vapor is drawn by the suction of the engine through the metering valve groove 39. At the same time air is drawn through the bleed-valve 29 to increase the velocity of the flow of water or vapor. As the engine speed is increased, the vacuum in the chamber 11 is proportionately reduced, so that, as the piston and shaft move further to the right, there is a gradual increase in the area of the metering valve groove 39 in the orifice opening, with the result that the stream of water or vapor drawn to the carburetor is increased in direct ratio with the increased engine speed.

While the foregoing description has been mainly directed to supplying water or vapor to the carburetor, it is pointed out that the injector can be used for supplying other fluids to desired parts of the engine or its associated mechanisms. For instance, the injector may be used as a lubricator, or oiler, for the upper cylinders or valves, in which case the supply tube 27 is connected to an oil supply tank or the like. The injector can be mounted in any relationship to the water or oil supply tank or in any relationship to the carburetor as it does not depend on gravity flow to bring the water or oil from the tank supply to the injector. In using the injector for oil or other fluids, the size of the tapered metering valve groove 39 may be changed, as desired, so as to accommodate different oil velocities, or other fluid characteristics.

I have illustrated and described a preferred and satisfactory embodiment of the invention, but it will be understood that changes may be made therein, within the spirit and scope thereof, as defined in the appended claims.

What is claimed is:

1. In a fluid injector for internal combustion engines, a body member having a vacuum chamber and inlet means for connecting said chamber to the intake manifold of the engine to establish pressure communication therewith, a piston movable in said chamber in one direction in response to increase of vacuum therein, and in opposite direction in response to reduction of vacuum therein, a fluid chamber having an outlet orifice for connection to the engine for establishing fluid feed communication therewith, fluid inlet means for supplying fluid to said fluid chamber, movable valve means operatively associated with said piston for movement therewith, and including means for opening and closing said orifice and means for opening and closing said fluid inlet means, and air inlet means for said fluid chamber.

2. In a fluid injector for internal combustion engines, a body member having a vacuum chamber and inlet means for connecting said chamber to the intake manifold of the engine to establish pressure communication therewith, a piston movable in said chamber in one direction in response to increase of vacuum therein, and in opposite direction in response to reduction of vacuum therein, spring means operating on said piston to move it in said opposite direction, a fluid chamber having an outlet orifice for connection to the engine for establishing fluid feed communication thereto, fluid inlet means for supplying fluid to said fluid chamber, movable valve means operatively associated with said piston for movement therewith, and including means for opening and closing said orifice, and closure means for said vacuum chamber having an air bleed-hole.

3. In a fluid injector for internal combustion engines, a body member having a vacuum chamber and inlet means for connecting said chamber to the intake manifold of the engine to establish pressure communication therewith, a piston movable in said chamber in one direction in response to increase of vacuum therein, and in opposite direction in response to reduction of vacuum therein, spring means operating on said piston to move it in said opposite direction, a fluid chamber having an outlet orifice for connection to the engine for establishing fluid feed communication thereto, fluid inlet means for supplying fluid to said fluid chamber, movable valve means operatively associated with said piston for movement therewith, and including means for opening and closing said orifice, closure means for said vacuum chamber, and a yieldable plunger carried by said closure means for contact by said piston at the limit of its movement in said opposite direction.

4. In a fluid injector for internal combustion engines, a body member having a vacuum chamber and inlet means for connecting said chamber to the intake manifold of the engine to establish pressure communication therewith, a piston movable in said chamber in one direction in response to increase of vacuum therein, and in opposite direction in response to reduction of vacuum therein, spring means operating on said piston to move it in said opposite direction, a fluid chamber having an outlet orifice for connection to the engine for establishing fluid feed communication thereto, fluid inlet means for supplying fluid to said fluid chamber, movable valve means operatively associated with said piston for movement therewith, and including means for opening and closing said orifice, closure means for said vacuum chamber having an oil pressure chamber adapted for connection to the oil pump of the engine, and a plunger movable in said chamber for contact by said piston at the limit of its movement in said opposite direction.

GUS SUDMEIER.

REFERENCES CITED

The following references are of record in the file of this patent:

UNITED STATES PATENTS

| Number | Name | Date |
| --- | --- | --- |
| 1,781,356 | West | Nov. 11, 1930 |
| 1,889,584 | Zimmerer | Nov. 29, 1932 |